United States Patent

Richmond et al.

[11] Patent Number: 5,824,279
[45] Date of Patent: Oct. 20, 1998

[54] PROCESS FOR PRODUCING STABILIZED MAGNESIUM HYDROXIDE SLURRIES

[75] Inventors: Alvin Richmond; Robert J. Gutowski, both of Manistee, Mich.

[73] Assignee: Martin Marietta Magnesia Specialties, Inc., Raleigh, N.C.

[21] Appl. No.: 375,442

[22] Filed: Jan. 19, 1995

[51] Int. Cl.⁶ .................................................. C01F 5/14
[52] U.S. Cl. ...................... 423/265; 252/313.1; 423/636
[58] Field of Search .................................. 423/155, 175, 423/636, 265; 252/313.1

[56] References Cited

U.S. PATENT DOCUMENTS

| | | | |
|---|---|---|---|
| Re. 28,807 | 5/1976 | Panzer et al. | 260/2 |
| Re. 28,808 | 5/1976 | Panzer et al. | 260/2 |
| 2,087,089 | 7/1937 | Hall | 167/72 |
| 2,335,373 | 11/1943 | Woodward | 210/62 |
| 3,288,770 | 11/1966 | Butler | 260/88.3 |
| 3,410,649 | 11/1968 | Sellet | 8/94.33 |
| 3,582,461 | 6/1971 | Lipowski et al. | 162/72 |
| 3,658,473 | 4/1972 | Sese | 23/201 |
| 3,692,898 | 9/1972 | Gorman | 424/158 |
| 3,738,945 | 6/1973 | Panzer et al. | 260/2 BP |
| 3,915,904 | 10/1975 | Tonkyn et al. | 260/2 BP |
| 3,957,674 | 5/1976 | Sano et al. | 252/182 |
| 4,147,627 | 4/1979 | Goodman | 210/58 |
| 4,155,741 | 5/1979 | Scher et al. | 71/65 |
| 4,164,521 | 8/1979 | Goodman | 525/187 |
| 4,166,040 | 8/1979 | Goodman | 252/180 |
| 4,166,041 | 8/1979 | Goodman | 252/180 |
| 4,230,610 | 10/1980 | Falcione et al. | 260/29.6 |
| 4,375,526 | 3/1983 | Zupanovich et al. | 524/436 |
| 4,412,844 | 11/1983 | Collins et al. | 44/51 |
| 4,430,248 | 2/1984 | Rey | 252/313 R |
| 4,548,733 | 10/1985 | Vincent | 252/310 |
| 4,743,396 | 5/1988 | Fong et al. | 252/313.1 |
| 5,076,846 | 12/1991 | Buri et al. | 106/401 |
| 5,143,965 | 9/1992 | Mertz | 524/436 |
| 5,487,879 | 1/1996 | Witkowski et al. | 423/155 |
| 5,514,357 | 5/1996 | Richmond et al. | 423/265 |

FOREIGN PATENT DOCUMENTS

| | | | |
|---|---|---|---|
| 0 293 642 A2 | 7/1988 | European Pat. Off. | C01F 5/14 |
| 1 215 118 | 4/1966 | Germany . | |
| 56-73623 | 6/1981 | Japan | C01F 5/14 |
| 56-73624 | 6/1981 | Japan | C01F 5/14 |
| 61-291413 | 12/1986 | Japan | C01F 5/14 |

OTHER PUBLICATIONS

PCT International Search Report for PCT/US96/00386.

*Primary Examiner*—Wayne Langel

[57] ABSTRACT

Magnesium hydroxide slurries and a method of producing same that can be shipped, without agitation, over a period of at least 28 days and can be readily removed from transport vehicles to customer storage. With respect to customer usage, such slurries can be readily handled without leaving significant residue in storage tanks and without fouling the customer's equipment. Also disclosed are magnesium hydroxide slurries containing a level of solids that is greater than what is commercially available and a method of producing same.

37 Claims, 2 Drawing Sheets

5,824,279

PROCESS FOR PRODUCING STABILIZED MAGNESIUM HYDROXIDE SLURRIES

FIELD OF THE INVENTION

The present invention relates to stabilized magnesium hydroxide slurries and to methods for their production.

BACKGROUND OF THE INVENTION

Magnesium hydroxide, $Mg(OH)_2$, is useful in various chemical processes including, but not limited to, the following: pH adjustment; precipitation of heavy metal contaminants; scrubbing and neutralization of acidic vapors such as those associated with flue gases or process off-gases; the production of specialty magnesium compounds; and so forth.

So long as they are sufficiently stable, slurries represent an effective and convenient form by which magnesium hydroxide can be furnished. For example, stabilized slurries of magnesium hydroxide have many advantages over other forms of magnesium hydroxide, including the ability to be easily handled, transferred and stored, and the ability to be reliably dosed to chemical processes as desired.

Magnesium hydroxide may typically be derived from three basic sources: seawater, well brines and magnesite ore. In a preferred process, a magnesium hydroxide slurry is produced from the chemical reaction of dolime (CaO.MgO) and well brine. The well brine comprises primarily calcium chloride but also includes magnesium chloride. The chemical reaction of dolime and well brine produces a slurry of magnesium hydroxide in a chloride-containing liquor. The slurry is then further processed to reduce chloride levels, typically to less than about 0.5%, and to increase solids content, typically to between about 30% and 60%. Unless indicated otherwise, all percentages in this application are weight percentages.

The above slurries, however, have a limited shelf life with respect to stability. First, even with agitation, thickening (i.e., increased viscosity) can occur. In addition, if the material is not agitated, the magnesium hydroxide solids will, after a period of time, typically about 1 to 4 hours, form a hard mass. The hard mass is resuspendable with great effort when dealing with small containers (e.g., up to approximately 5 gallons). However, the hard mass cannot, for all practical purposes, be resuspended when dealing with large containers (e.g., storage tanks, rail cars, trucks), due to the extreme amounts of energy required for such large volumes.

Moreover, in many applications, processing, storage and transportation costs are quite significant. In an attempt to reduce these costs, the above slurry is typically processed to increase the solids content to about 50–60% to reduce water content. However, even after boosting the solids content to these levels, the slurry still contains substantial amounts of water, giving the material added weight and volume, and thus keeping transportation costs high and limiting the amount of saleable product shipped. Dewatering magnesium hydroxide slurries to a solids content of greater than about 60%, however, has proven impractical. Furthermore, the shelf life with respect to stability of the slurry still remains a problem.

SUMMARY OF THE INVENTION

The above and other problems associated with magnesium hydroxide slurries have been overcome by the present invention, through which stabilized magnesium hydroxide slurries over a very broad solids range can be provided.

The present invention is advantageous in that it provides a process for producing commercial quantities (e.g., several thousand gallons per hour) of magnesium hydroxide slurry with long term stability.

Another key advantage associated with slurries having long-term stability is that such slurries can be transported by rail cars, 250 to 500 gallon totes, 55 gallon drums and so forth over long distances (for example, coast to coast) for long periods of time (for example, several weeks) and then be readily removable from the above containers without leaving any appreciable quantity of slurry in the container. In addition, once transferred to the customer's storage tanks, such magnesium hydroxide slurries will remain stable with minimal agitation, or if solids settle due to lack of agitation, the settlement is readily resuspendable (for example with minimal agitation, recirculation or air sparging).

There are many additional advantages associated with the production of $Mg(OH)_2$ slurries at solids concentrations in excess of 60 percent. These advantages include, but are not limited to, cost savings associated with the ability to provide a high solids concentration. Capital costs, operating costs, freight costs and so forth can all be reduced by utilizing high solids magnesium hydroxide slurries of the present invention. For example, capital costs are reduced, because less slurry will be stored and transported for a given mass of magnesium hydroxide that is provided. As a result, storage tanks are reduced in size or number, and transportation equipment such as pumps, pipelines, rail cars and so forth are likewise reduced in size or number. Similarly, operating costs are reduced because, for example, there is less maintenance associated with less volume passing through and abrading the processing equipment. Freight costs are reduced, for example, because there is more saleable weight of magnesium hydroxide shipped for a given weight and volume of slurry.

According to an embodiment of the invention, a magnesium hydroxide slurry having a solids content ranging from about 30% to about 80% and having a chloride concentration above a first threshold level is described. The solids in the slurry exhibit a predetermined amount of deflocculation. In addition, the slurry also contains a predetermined amount of cationic coagulant, if the slurry contains more than or equal to a second threshold level of chloride.

According to another embodiment of the invention, a method for producing a magnesium hydroxide slurry is disclosed. In this embodiment, a magnesium hydroxide slurry with a solids content of about 30 to 80% is provided and the chloride concentration in the slurry determined. If the chloride concentration is less than a preselected first threshold level, then chloride is added to the magnesium hydroxide slurry to achieve a chloride concentration ranging from the preselected first threshold level to less than a preselected second threshold level. If the chloride concentration is more than or equal to the preselected second chloride threshold level, a predetermined amount of cationic coagulant is added to the magnesium hydroxide slurry.

The magnesium hydroxide slurry is deflocculated to a predetermined level.

These and other embodiments and advantages of the invention will become apparent to those skilled in the art after further consideration of this specification and the appended claims.

DETAILED DESCRIPTION OF THE INVENTION

Figure 1:
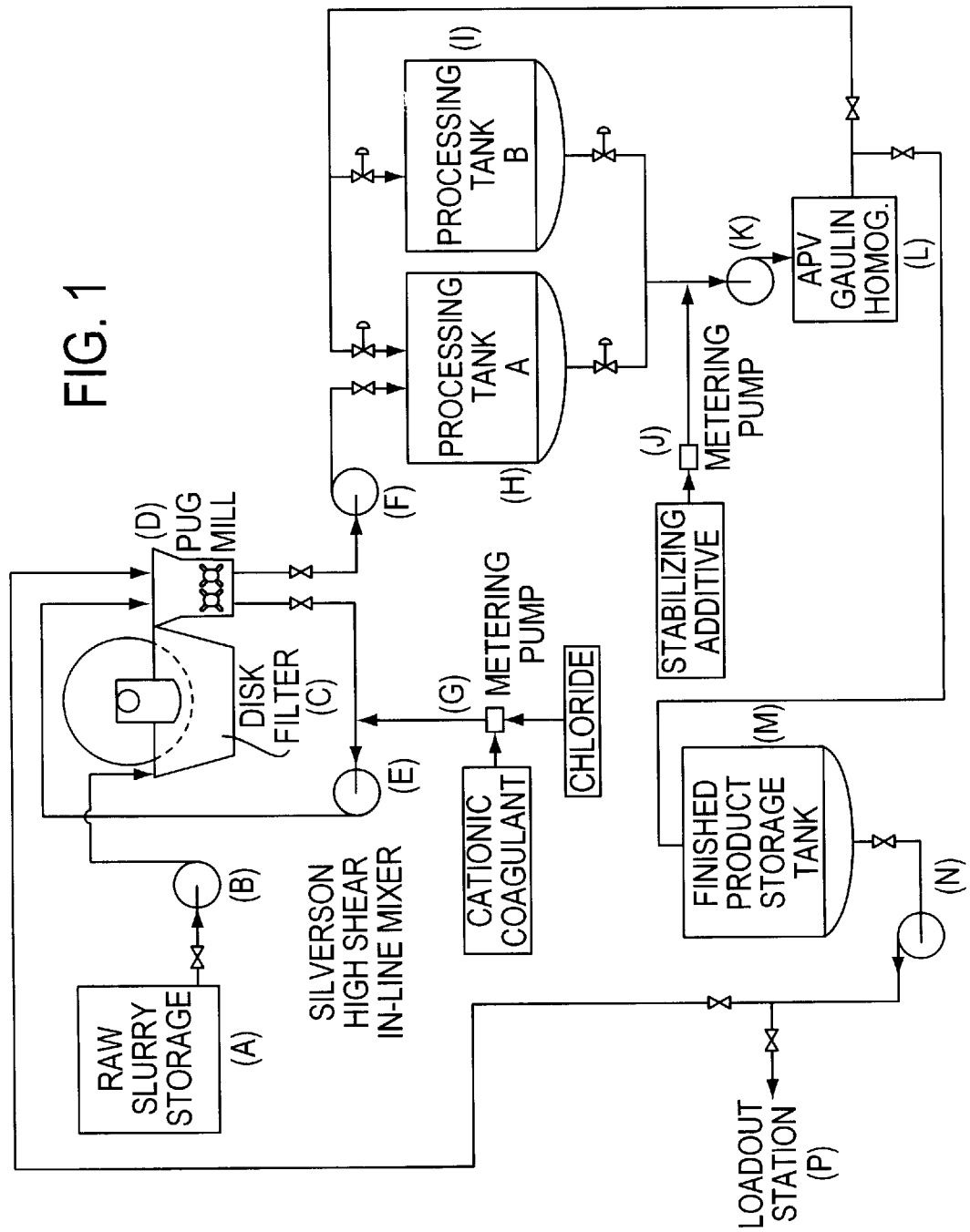
FIG. 1 is a diagram of a processing scheme for producing high solids magnesium hydroxide slurries, according to an embodiment of the present invention.

The present invention concerns stabilized magnesium hydroxide slurries and methods for their production.

There are a number of adequate measures for assessing the stability of a slurry. Perhaps the most practical assessment of slurry stability is whether the solids can be readily resuspended with mild agitation (e.g., by air sparging) and pumped from a container (such as a rail car, truck, tote, 55 gallon drum, and so forth) with a minimum quantity of solids (i.e., typically less than 5%) remaining.

A more quantitative way of defining and measuring stability is based on the pourability of a sample after a given settling period. As an example, a pre-weighed 5 ¼" high×2" diameter high density polyethylene sample bottle with cap, available from Cole Parmer, is filled with slurry to capacity. After a given period of unagitated storage at room temperature, the cap is removed, a glass stirring rod is inserted to the bottom of the bottle, and the end is slowly rotated one turn around the inner periphery of the bottle. The bottle is then weighed, inverted 180° for a period of 15 seconds, reweighed, and percent drainage calculated as follows:

$$\% \text{ drainage} = \frac{(\text{filled bottle weight} - \text{drained bottle weight})}{(\text{filled bottle weight} - \text{bottle weight})} \times 100$$

The solids remaining in the bottle are then probed with a stirring rod to determine whether they are soft, tacky (e.g., like bubblegum) or hard.

A drainage test result of at least 80% (i.e., 80%–100%) is excellent for a 15 second inversion time. If the material remaining in the channel bottle is soft and no lumps are present, then greater than 95% drainage will occur in a one minute pour period. A portion of slurry remaining in the bottle will be present due to surface tension with the bottle's interior wall. In practical terms, this means that the slurry will be easily resuspendable (e.g., by air sparging) and pumpable from containers using those pumps (e.g., centrifugal pumps) commonly found in the slurry industry.

Unless indicated otherwise, all percent drainages listed herein are based on a 15 second inversion time and a soft residue.

Of course, if desired, a one minute pour period can be employed, with a percent drainage of at least 95% being an excellent result.

A slurry is deemed to have "long term stability" if it has a percent drainage of at least 90% after 7 days, at least 85% after 14 days and at least 80% after 28 days. The above criteria for long term stability are rigorous—assuring ready resuspendability and pumpability after a storage period of at least 28 days without agitation. Of course, other drainage criteria will become apparent to those skilled in the art, depending on the application requirements at hand.

It is believed that practically any source of magnesium hydroxide can be used in connection with the present invention. Convenient sources of precursory magnesium hydroxide slurry for the practice of the present invention include those produced from seawater, well brines and magnesite ore.

Preferred precursory magnesium hydroxide slurries of the present invention are those slurries produced by the reaction of well brine with dolime. In a typical process, a magnesium hydroxide slurry is produced from the chemical reaction of dolime (CaO.MgO) and well brine. The dolime used for this reaction can be obtained, for example, from dolomitic limestone which is quarried, crushed and calcined in kilns to produce dolime as follows:

$MgCO_3.CaCO_3 \rightarrow MgO.CaO + CO_2$

The well brine used for this reaction typically comprises primarily calcium chloride but also includes magnesium chloride. The chemical reaction of dolime and well brine produces a slurry of magnesium hydroxide in a chloride-containing liquor according to the following reaction scheme:

$MgO.CaO + H_2O \rightarrow MgO + Ca(OH)_2$ $Ca(OH)_2 + MgCl_2 \rightarrow Mg(OH)_2 + CaCl_2$ $MgO + H_2O \rightarrow Mg(OH)_2$ The magnesium hydroxide slurry at this stage typically comprises about 6 to 9% solids in an enriched calcium chloride liquor having about 15 to 20% chlorides which is hereinafter referred to as "spent brine." The slurry is typically further processed to increase solids content and reduce chloride levels. For example, the slurry can be thickened by settling and filtration and washed relatively free of chlorides during filtration. Preferably, the slurry is produced by a continuous process, with the slurry overflow of the reactors being directed to thickeners where settling occurs, and with the slurry underflow of the thickeners being directed to a filter for purposes of washing and thickening.

After thickening and washing, a typical precursory slurry product of the above process has a solids content ranging from about 30 to 60%, a chloride level less than about 0.5%, on a dry MgO basis, and a viscosity of 500 to 2000 cps. Unless indicated otherwise, all viscosities in this application refer to those measured with a Brookfield viscometer at 100 RPM after one minute of rotation. As will be appreciated by those skilled in the art, the spindle used in the Brookfield unit will vary with the viscosity of the slurry. For example, a #3 spindle is used for viscosities less than 1000 cps. Above this viscosity, a #4, #5 or #6 spindle is used as appropriate.

As used herein, the term "low solids" is used to describe slurries with solids content of about 50% or less, preferably 30% to 50%, while the term "intermediate solids" is used to describe slurries with solids content of about 50% to 60%.

The inventors have found that the stability of a given slurry is enhanced by conditioning the solids via physical deflocculation and, if necessary, altering the environment surrounding the solids. These procedures, which are discussed in more detail below, will be generally referred to as physical deflocculation and chemical treatment steps.

As discussed below, low and intermediate solids precursory slurries are pumpable and can be directly subjected to physical deflocculation and, if necessary, chemical treatment steps to provide a slurry with long term stability.

However, when a magnesium hydroxide slurry with a solids content of more than about 60% solids is desired, there are difficulties associated with dewatering and handling the resultant cake. One embodiment of the present invention addresses these difficulties.

According to this embodiment, a precursory slurry is dewatered to adjust the solids content to greater than about 60% solids, preferably up to 80% solids, more preferably about 65% to 70% solids. Slurries having such solids content are referred to herein as "high solids" slurries. The preferred precursory slurry used for this purpose is an intermediate solids precursory slurry like that previously referenced, but other slurries can be used.

Immediately after dewatering to high solids, the resulting magnesium hydroxide cake can be said to have a consistency much like that of cardboard and cannot be pumped in that form. In fact, the viscosity is so high that it cannot be measured with a Brookfield viscometer.

Suitable dewatering systems include pressure systems, vacuum systems, capillary action systems and so forth, with pressure and vacuum filtration systems being generally preferred. In selecting an appropriate dewatering system, care should be taken to ensure that the system selected can handle the changes in morphology that may affect dewatering. For example, filtered magnesium hydroxide slurries may have a tendency to form cracks upon dewatering, which can limit the extent to which the slurry can be dewatered using this method. A rotary vacuum disk filter such as that in FIG. 1 below can be used for the practice of the invention and is generally preferred for applications from about 60% up to about 70%, more typically 60 to 65%. Pressure filter systems are even less vulnerable to such changes in morphology and are preferred for applications up to about 80%.

Once the slurry is dewatered to a high solids content, it must be subjected to a significant shear stress (i.e., agitated) to provide a pumpable, high solids slurry that can be subjected to further treatment steps. Although agitation does not improve the flow characteristics of most ordinary materials, the dewatered cakes of the present invention are, nonetheless, improved by such treatment. Agitation is an effective treatment measure, because dewatered magnesium hydroxide cakes belong to a class of slurries known as "thixotropic slurries". Thixotropic slurries are slurries that exhibit a decrease in viscosity with time, upon the application of a shear stress. As a result, the dewatered cake actually becomes less viscous upon agitation.

A wide variety of equipment is available that can be used to subject the dewatered cake to shear stresses. In general, best results are achieved by subjecting the cake to high shear strain rates, preferably ranging from about 130,000 to 150,000 s$^{-1}$. High-shear equipment useful for the practice of the present invention includes, for example, high-shear in-line mixers, high-shear high-speed agitators and so forth, with high-shear in-line mixers such as Model 700LS sold by Silverson Machines, Inc. of East Longmeadow, Mass., being preferred. Such treatment typically decreases the viscosity of the dewatered cake to about 200 to 1000 cps.

Although the slurry produced by the above treatment is pumpable, if left unagitated, the viscosity of this slurry will gradually increase until the viscosity can no longer be measured by a Brookfield viscometer. In other words, the material does not possess long term stability.

In applying shear, multiple passes through the high-shear equipment may be desirable. For example, when using a high-shear in-line mixer in recycle mode, it is preferred to turn the material over through the mixer an average of 1 to 6 times, more preferably 3 to 4 times, to decrease the slurry viscosity to the range of 200 to 1000 cps.

In general, it is difficult to immediately process the dewatered cake with the high-shear equipment. Thus, according to a preferred embodiment of the invention, the dewatered cake is initially mixed into a start-up fluid or slurry with a preferred viscosity of 70 to 700 cps, preferably at low shear. The start-up fluid or slurry can be practically any fluid or slurry that is compatible with the incoming dewatered cake, so long as the resulting mixture of the dewatered cake and the start-up fluid or slurry is rendered passable through the high shear equipment. For example, previously stabilized high-solids slurries of the present invention, the slurries with a solids content of about 30% up to about 80%, or even water, can be used for this purpose. Previously stabilized magnesium hydroxide slurries of the invention having a solids content of about 55 to about 70%, more preferably 60–70%, are preferred because they have essentially the same solids content of the dewatered cake, yet still facilitate processing due to their lower viscosity. Water is less preferred because it reduces the solids content. Once the dewatered cake and the start-up fluid or slurry are mixed at low shear, the resulting material is subjected to treatment with a high-shear device such as one of those listed above. The pug mill used in FIG. 1 below is an example of a typical piece of low-shear mixing equipment. Other equipment will become readily apparent to those skilled in the art.

As previously noted, treatment with high-shear equipment is sufficient to reduce the viscosity of the high solids cake to about 200 to 1000 cps. The resulting high solids slurry, like slurries having 30–60% solids, can be pumped and therefore is in a form that can be effectively utilized in further treatment steps. For purposes of convenience, all such slurries will be collectively referred to as "pumpable slurries".

Accordingly, in another embodiment of the invention, pumpable slurries that do not have long term stability are subjected to physical deflocculation and, if necessary, chemical treatment, to provide desirable long term stability. In particular, these slurries can be subjected to physical deflocculation and, if necessary, can be subjected to chemical treatment with chloride and/or cationic polymer to provide long term stability.

Without wishing to be held to any particular theory, our current understanding of the factors affecting the stability of magnesium hydroxide slurries is as follows. Magnesium hydroxide slurry has a tendency to settle hard. For long-term stability, deflocculation of the slurry is required. Unfortunately, all magnesium hydroxide slurries will reflocculate with time. However, the environment surrounding the particles can be manipulated to retard this effect. It is believed that the environment affects particle surface charge which in turn affects reflocculation. This surface charge can be manipulated through the addition of cationic polymer and/or chloride. Additionally, other factors may come into play, including morphology of the magnesium hydroxide solids.

"Physical deflocculation" as used herein means to physically break apart agglomerates of $Mg(OH)_2$ particles without breaking down significant amounts of the $Mg(OH)_2$ particles themselves.

Physical deflocculation of pumpable slurries such as those discussed above can be accomplished using commercially available equipment. In general, equipment that can be used for this purpose include tandem shear pipeline mixers, high-speed dispersion blades, equipment that induces cavitation in the slurry, and so forth. Particularly preferred are APV Gaulin Homogenizers manufactured and sold by APV Gaulin of Wilmington, Mass., IKA-Works Dispax Reactors such as the IKA three-stage DR3-6/6A Dispax Reactor sold by IKA Works, Inc. of Cincinnati, Ohio, Cherry-Burrell Homogenizers sold by Cherry-Burrell Process Equipment, Louisville, Ky. and Sonic Corporation Sonolators such as the Triplex T-42EM Sonolator sold by Sonic Corporation of Stratford, Conn. APV Gaulin Homogenizers which have "homogenizing valves" that operate to induce cavitation in the slurry are most preferred.

The inventors' preferred way of determining whether the material is sufficiently deflocculated is to vary the process variables associated with deflocculation while holding all other process variables constant and observing any changes in the stability of the resulting product that occur as a result of this variation.

Pressure settings for the APV Gaulin unit are preferably 1000–5000 psi, more preferably about 2000 to 3000 psi, and most preferably about 2500 psi.

In addition, multiple deflocculation passes may be performed. The term "pass" refers to a complete turnover of the slurry in the vessel. In a preferred method of operation, the slurry is passed through an APV Gaulin Homogenizer from 1 to 10 times, more preferably 3 times, at approximately 2500 psi. An alternative method of operation is to recycle the slurry through the APV Gaulin Homogenizer instead of using discrete passes. A preferred recycling time, at approximately 2500 psi, is that required to complete the equivalent of about 3.25 passes. So long as the environment is properly adjusted, the number of passes or recycling time at 2500 psi will provide slurries having percent drainages of at least 90%, 85% and 80% after 7, 14 and 28 days, respectively. More passes or recycling at this pressure have been found to give improved results, but only marginally. Fewer passes or recycling have been found to result in declining stability.

During deflocculation, the viscosity of the slurry is reduced, generally from 200 to 2000 cps to about 70 to 700 cps, depending on the solids, chloride and cationic polymer levels.

As noted above, it may also be desirable to add cationic polymer or chloride to the slurry. The amount of cationic polymer and chloride to be added to the slurry are interrelated. Based on this disclosure, it is well within the skill of those in the art to determine when it is desirable to add cationic polymer and/or chloride to the solution. As with physical deflocculation, the need for chloride and/or cationic polymer can be investigated by varying the amount of each, while holding all other process variables constant. Alternatively, all variables of interest can be manipulated in a designed experiment format to identify variable interactions. The resulting slurries can then be characterized according to their respective stabilities.

In general, it has been found that there is a first optimum chloride level in the liquor. In the event less chloride is present, it should be increased to this first optimum level. As chloride level is increased in excess of the first optimum level, stability begins to deteriorate until a second level is attained, wherein it becomes necessary to add cationic polymer to counteract the effects of the excess chloride to achieve desired stability.

The inventors have found that the chloride level should be at least equal to a first chloride threshold level. If not, chloride should be added to reach this level. Once the first chloride threshold level is reached, the product generally has long-term stability, after deflocculation, up to a second chloride threshold level. However, once the second chloride threshold level is met or exceeded, cationic polymer must be added to supplement deflocculation. Increasing cationic polymer levels are required with increasing chloride levels.

Unless otherwise indicated, all chloride levels discussed herein are expressed in terms of the concentration of chloride in the liquor. The liquor is the liquid portion of the slurry that is mingled with the solids and can be separated, in part, from the solids by filtering, pressing, and so forth. The chloride concentration in the liquor can be determined in any manner known to those of ordinary skill in the art including evaporation and the use of X-Ray Fluorescence Spectrometry. Typically, chloride analysis is performed by checking for chloride remaining with dry magnesium hydroxide or magnesium oxide after water has been evaporated. Thus, percent solids and chloride level, on a dry magnesium hydroxide or magnesium oxide basis, are determining factors with respect to chloride concentration in the liquor. Table 3 is provided to demonstrate this relationship.

The particular values for the first and second threshold levels will depend upon the stability requirements of the product. For example, based on percent drainages of at least 90%, 85% and 80% after periods of 7, 14 and 28 days, respectively, these first and second chloride threshold levels have been determined to be 2.7±0.5 g/l and 4.0±0.5 g/l, respectively, more preferably 2.7±0.2 g/l and 4.0±0.2 g/l, respectively. Thus, when the chloride level in the liquor is less than about 2.7 g/l, it is desirable to add chloride to adjust the level to range from about 2.7 up to less than about 4.0 g/l. When the chloride level in the liquor is between about 2.7 and less than about 4.0 g/l, there is generally no need to add chloride or cationic polymer to the slurry. When the chloride level in the liquor is greater than or equal to about 4.0 g/l, it is generally desirable to add cationic polymer to the slurry.

Preferred sources of chloride include, but are not limited to, spent brine and calcium chloride, with spent brine being more preferred.

Preferred cationic polymers for the practice of the present invention are a class of cationic polymers known as "cationic coagulants." Although such compounds are described as coagulants, in the amounts used herein, they do the opposite in that they actually retard flocculation. Preferred cationic coagulants for the practice of the present invention are polyamines, polyquaternaries, polydiallyl-dimethyl ammonium chlorides, epichlorohydrin-dimethylamines and dicyandiamide-formaldehyde condensates, with those polymers described in U.S. Pat. Nos. Re. 28,807; Re. 28,808; 3,288,770; 3,410,649; 3,582,461 and 3,915,904 being most preferred. Unless indicated otherwise, all references cited herein are incorporated by reference in their entirety. The preferred molecular weight of the cationic coagulant is 100,000 to 500,000.

Specific cationic coagulants that are readily available for the practice of the present invention include:

(a) a cationic coagulant sold under the designation Holly Fix 1 by Polymer Ventures, Inc. of Fountain Inn, S.C., which is a dicyandiamide-formaldehyde condensate of the type described in U.S. Pat. No. 3,582,461 or in U.S Pat. No. 3,410,649;

(b) a cationic coagulant sold under the designation BETZ 1180 by Betz Laboratories, Inc. of Trevose, Penn., which is a copolymer of dimethylamminopropylamine and epichlorohydrine as described in U.S. Pat. No. 3,915,904;

(c) a cationic coagulant sold under the designation BETZ 1190 by Betz Laboratories, Inc., which is a reaction product of dimethylamine epichlorohydrine as described in Example 1 of U.S. Pat. No. Re. 28,807;

(d) a cationic coagulant sold under the designation BETZ 1192 by Betz Laboratories, Inc., which is a cross-linked polyquarternary polymer formed from ethylenediamine, dimethylamine and epichlorohydrine as described in Example 2 of U.S. Pat. No. Re. 28,808;

(e) a cationic coagulant sold under the designation BETZ 1195 by Betz Laboratories, Inc., which is a polydiallyldimethylammonium chloride as described in Example 1 of U.S. Pat. No. 3,288,770;

(f) a cationic coagulant sold under the designation RHONE POULENC C-308P by Rhone Poulenc, Inc. of Parsippany, N.J., which is a reaction product of a quaternary ammonium chloride salt monomer as described in Example 1 of U.S. Pat. No. 3,288,770;

(g) a cationic coagulant sold under the designation RHONE POULENC C-309P by Rhone Poulenc, Inc., which is a reaction product of a secondary amine and an epihalohydrin or diepoxide as described in U.S. Pat. No. Re. 28,808;

(h) a cationic coagulant sold under the designation RHONE POULENC C-319P by Rhone Poulenc, Inc., which is a reaction product of a secondary amine and an epihalohydrin or diepoxide as described in U.S. Pat. No. Re. 28,808; and (i) a cationic coagulant sold under the designation RHONE POULENC C-358P by Rhone Poulenc, Inc., which is a reaction product of a quaternary ammonium chloride salt monomer as described in Example 2 of U.S. Pat. No. 3,288,770.

Additional sources of cationic coagulants will become readily apparent to those of ordinary skill in the art.

When required, 10 to 5000 ppm of cationic coagulant is generally sufficient to treat the slurry. However, it is to be understood that the amount of cationic coagulant required depends upon the type of cationic coagulant, the chloride level and indirectly with percent solids (e.g., see Table 3), with higher chloride levels requiring higher coagulant additions. For example, using HollyFix-1 available from Polymer Ventures, Inc., adequate results are achieved using 1000 ppm at 4.0 g/l chloride, 2500 ppm at 5.0 g/l chloride and so forth. On the other hand, using C-308P from Rhone Poulenc, Inc., adequate results are achieved using 500 ppm at 4.0 g/l, 1000 ppm chloride at 5.0 g/l, and so forth. Chloride levels above 6.0 g/l are uncommon in commercially available magnesium hydroxide slurries.

The cationic coagulant or chloride can be mixed with the slurry to be treated at any point during processing. For high-solids slurries, it is preferred to mix the cationic coagulant or chloride into the slurry either before treatment with the high shear equipment (e.g., the Silverson unit) or after treatment with the high shear equipment, but before treatment with the deflocculation equipment (e.g., the Gaulin unit), with addition before treatment with the high shear equipment being more preferred. For low or intermediate solids slurries, it is preferred to mix the cationic coagulant or chloride into the slurry before treatment with the deflocculation equipment, e.g., immediately prior to a first pass through the deflocculation equipment.

In addition to the cationic coagulant, supplemental additives may be supplied to provide the slurries of the invention with additional desirable structural properties and to render any settlement that may occur even easier to resuspend. Such additives include, but are not limited to, carboxymethylcellulose (CMC), guar gum and xanthum gum, with CMC being more preferred. In the event CMC is used, preferred concentrations range from about 5 to about 200 ppm, more preferably about 5 to about 20 ppm, most preferably about 10 ppm. At concentrations above about 200 ppm, viscosity may become unnecessarily high; at concentrations below about 5 ppm, resuspension of any settlement that may occur is more difficult. CMC is particularly preferred in connection with the high solids slurries of the present invention. As an example, carboxymethylcellulose T-Grade, manufactured by LeChem, Inc., of Baton Rouge, La. can be provided in a 1% solution in water at 10 ppm dosage rate (total slurry weight basis).

The supplemental additives can be provided at any point within the process of the invention, preferably before the final pass through the deflocculation equipment and after the addition of cationic coagulant or chloride.

It will become immediately clear to those skilled in the art that the processes of the present invention can be partially or completely automated. Moreover, it will also become immediately clear to those skilled in the art that processing modes can be continuous, semi-continuous or batch for the various process steps of the present invention.

Still other embodiments for the practice of the present invention will be apparent to those skilled in the art upon consideration of this specification or practice of the invention disclosed herein.

The invention will be further clarified by consideration of the following examples, which are intended to be purely exemplary of the use of the invention.

EXAMPLES

Example 1

An example of a process for preparing a high-solids stabilized magnesium hydroxide slurry in a semi-continuous fashion is discussed below in connection with FIG. 1. Of course, this is just one of many schemes for implementing the high-solids process of the present invention.

Referring now to FIG. 1, a washed and thickened precursory magnesium hydroxide slurry, typically at 45–55% solids and having a viscosity range of 500–1000 cps, is pumped and held as surge in slurry storage tank (A).

Pug mill (D) is initially filled with a stabilized magnesium hydroxide slurry from finished product storage tank (M). Pump (N) is run until the pug mill (D) is filled with slurry taken from the finished product storage tank (M). Pump (N) is then shut down. Thus, for start up purposes, the pug mill (D) is preferably filled with the high solids stabilized magnesium hydroxide slurry of the present invention. But the pug mill (D) can also be, for example, filled with other media such as precursory slurry or even water.

A Silverson High-Shear In-Line mixer (E) is then operated to withdraw slurry from the bottom of pug mill (D) and reintroduce this slurry back into the top of pug mill (D).

Pump (B) is then operated to transfer precursory slurry from slurry storage tank (A) to rotary vacuum disk filter (C). When the slurry in the tub of the rotary vacuum disk filter reaches the desired level, the rotary vacuum disk filter (C) is started. The speed of pump (B) is then manipulated to maintain the desired tub level in the rotary vacuum disk filter (C).

The rotary vacuum disk filter (C) is then operated to discharge a dry cardboard-like cake, typically at 60 to 70% solids, to pug mill (D).

As soon as the filtered cake being discharged from disk filter (C) reaches the pug mill (D), cationic coagulant or additional chloride is injected, if dictated by chloride level, into the Silverson mixer (E) suction line by running metering pump (G). The flow ratio of the Silverson mixer (E) and the discharge rate of the disk filter (C) can be adjusted to ensure adequate shear stress application. For example, the flow rate of the Silverson mixer is preferably about 200 gpm and the disk filter (C) discharge rate is preferably set at about approximately 60 gpm. In this instance, the slurry in pug mill (D) is, therefore, on average, passing through the Silverson High Shear In-Line mixer about 3.33 times. The flow rate out of pug mill (D) is controlled with pump (F) to maintain a constant level in pug mill (D) and to optimize the pug mill's mixing potential. The discharge of pump (F) is collected in processing tank A (H). The slurry collected in processing tank A (H) typically has a viscosity of about 200 to 1000 cps.

Processing as described above continues until the desired batch size is collected in processing tank A (H). When the desired level is attained in processing tank A (H), pump (B), disk filter (C), pug mill (D), Silverson High-Shear In-Line mixer (E), cationic coagulant metering pump (G), and pump (F) are shut down. The above start up procedure effectively achieves a steady-state operation and can be repeated for each start up.

Valve positions are then set to direct flow from the bottom of processing tank A (H), through pump (K), through APV Gaulin Homogenizer (L), and into processing tank B (I). Pump (K) and APV Gaulin Homogenizer (L) are started to initiate flow. The APV Gaulin Homogenizer (L) pressure is preferably set at about 2500 psi. The entire contents of processing tank A (H) are transferred through pump (K) and the APV Gaulin Homogenizer (L) operated at 2500 psi and are collected in processing tank B (I). One "pass" is now completed.

Valve positions are then reset to direct flow from the bottom of processing tank B (I), through pump (K), through APV Gaulin Homogenizer (L), and into processing tank A (H). Pump (K) and APV Gaulin Homogenizer (L) are restarted to initiate flow. The APV Gaulin Homogenizer (L) pressure is again preferably set at about 2500 psi. The entire contents of processing tank B (I) are transferred through pump (K) and the APV Gaulin Homogenizer (L) and are collected in processing tank A (H). The second "pass" is now complete.

Valve positions are then reset to direct flow from processing tank A (H), through pump (K), through APV Gaulin Homogenizer (L), and into finished product storage tank (M). Pump (K) and APV Gaulin Homogenizer (L) are restarted to initiate flow. The APV Gaulin Homogenizer (L) pressure is again preferably adjusted to about 2500 psi. Stabilizing additive (preferably a 1% solution of carboxymethyl cellulose) is injected to achieve a final CMC concentration of 10 ppm (dry CMC, total slurry weight basis) during this step by running metering pump (J). The entire contents of processing tank A (H) are transferred through pump (K) and the APV Gaulin Homogenizer (L) and are collected in finished product storage tank (M). Pump (K), pump (J), and APV Gaulin Homogenizer (L) are then shut down. All valves are then closed. The final pass is now complete and finished product is held in tank (M). The finished product typically has a solids content of about 60 to 70% and a viscosity of 70–700 cps, preferably 100–600 cps.

The final product can then be loaded into trucks, rail cars, tote bins, or drums from finished product storage tank (M) by running pump (N) and directing flow to loadout station (P).

If desired, an alternate processing mode involving the APV Gaulin homogenizer can be employed. Instead of completing three distinct passes through the homogenizer, the contents held in processing tank A (H) can be recycled through the homogenizer back into the top of processing tank A (H) for an adequate amount of time.

Example 2

An example of a process for preparing low or intermediate solids stabilized magnesium hydroxide slurries in a semi-continuous fashion is discussed below in connection with FIG. 2. Of course, this is just one of many schemes for implementing the process of the present invention.

Figure 2:
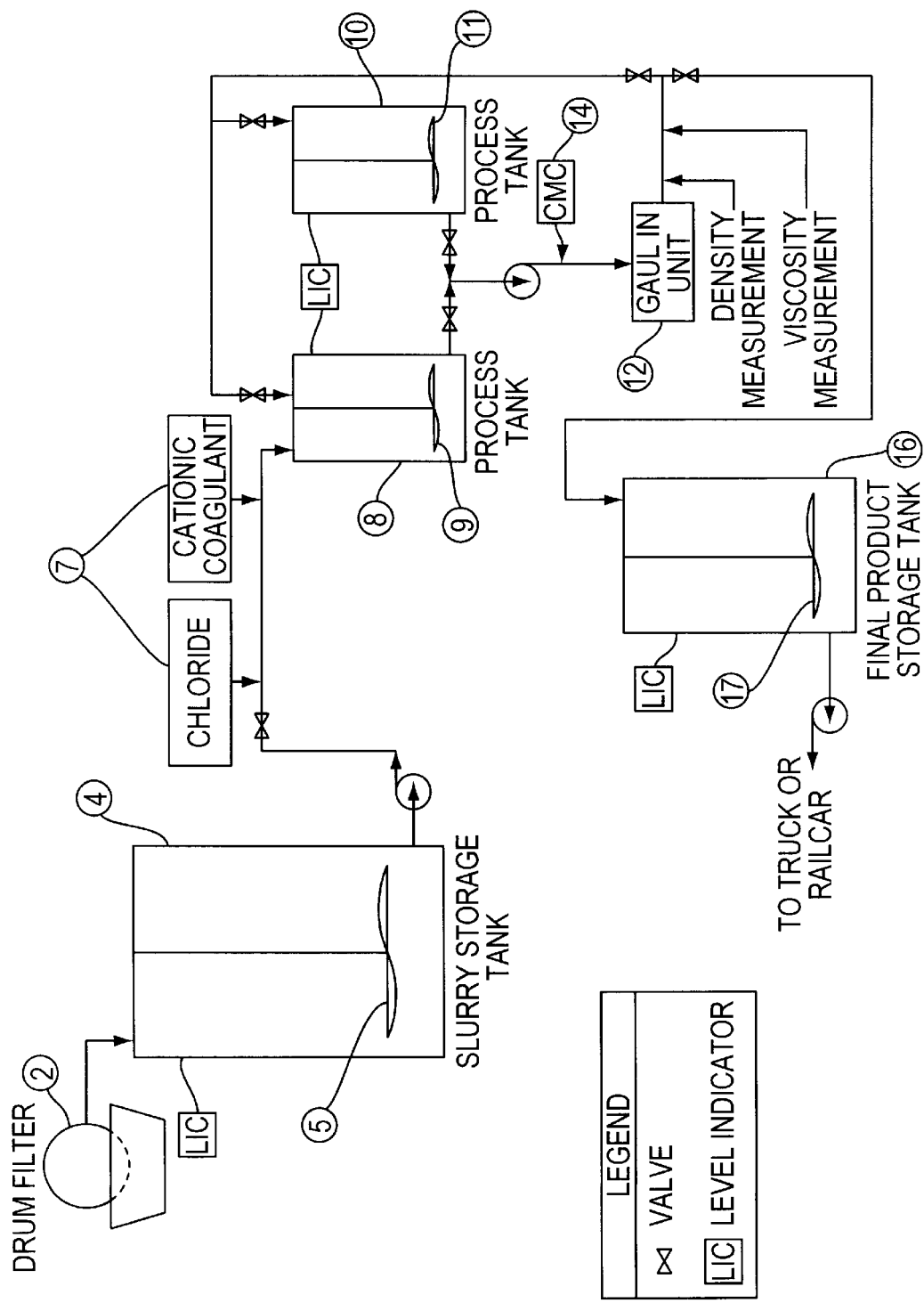
FIG. 2 is a diagram of a processing scheme for producing low or intermediate solids magnesium hydroxide slurries, according to an embodiment of the present invention.

Referring now to FIG. 2, a precursory magnesium hydroxide slurry, typically having a solids content of approximately 30–60% and a viscosity of 200 to 2000 cps, produced by a conventional process such as from well brines, is transferred from a drum filter unit 2, utilized in producing the precursory slurry, to slurry storage tank 4. Slurry storage tank 4 contains agitation means 5, to minimize the agglomeration of the magnesium hydroxide solids in the precursory slurry.

The chloride content of the precursory slurry may be determined in the slurry storage tank 4. The precursory slurry is pumped from slurry storage tank 4, to process tanks 8 and 10.

Depending on the chloride content of the precursory slurry, chloride or a cationic coagulant may be added to the slurry while the slurry is being pumped from storage tank 4 to process tanks 8 and 10. The addition of chloride or cationic coagulant to the slurry is represented by boxes 7. The chloride or cationic coagulant is evenly distributed throughout the precursory slurry in process tanks 8 and 10 and during passes through the homogenizer.

From the process tanks 8 and 10, the slurry is pumped through homogenizer 12, which is preferably an APV Gaulin homogenizer, manufactured and sold by APV Gaulin of Wilmington, Mass. The homogenizer 12, deflocculates the magnesium hydroxide solids in the slurry. The slurry may be passed through the APV Gaulin Homogenizer 12 and back into process tanks 8 and 10, 3 times at approximately 2500 psi.

Optionally, a supplemental material, such as CMC may be added to the slurry as the slurry is being passed through the homogenizer. The addition of a supplemental stabilizing additive to the slurry (shown in FIG. 2 as CMC) is illustrated by box 14 in FIG. 1.

After deflocculation has been completed, the stabilized magnesium hydroxide slurry, which typically has a viscosity of 70 to 700 cps, is transferred from the homogenizer to final product storage tank 16. The final product storage tank 16 may contain means for agitating, 17, however, such means are not necessary. From storage tank 16 the stabilized magnesium hydroxide slurry of the present invention may be transferred to rail cars or other appropriate vessels for transport.

Example 3

One gallon of washed magnesium hydroxide slurry made from the dolime/magnesium chloride-containing salt brine process discussed above was used as a starting material in each sample discussed below. This starting material had a solids content of 50–55%, a viscosity of 200 to 1500 cps, and varying chloride levels.

The above starting material was used to provide each of the samples used in this example. In the event that a lower solids level was required, water was added. In the event that a higher solids level was required, the material was dewatered utilizing a Buchner Funnel, a laboratory vacuum pump and No. 40 Whatman Filter paper. The solids content was determined by evaporation.

Similarly, in the event that a higher chloride level was required, spent brine containing 15 to 20% chloride was added. In the event that a lower chloride level was required, the material was subjected to further washing steps. The chloride concentration in the liquor was determined by evaporation, followed by X-Ray Fluorescence Spectrometry.

In high solids cases, where the viscosity was so high that the material could not be immediately run through an APV Gaulin laboratory homogenizer, the mixture was subjected to high-shear mixing using a 4" diameter Cowles-type agitator on a mixer sold by Indco Incorporated, New Albany, Ind., running at 2,250 RPM for 15 minutes to reduce the viscosity.

The material was then deflocculated by running it through an APV Gaulin laboratory homogenizer set at 2,500 psi over a time period required to complete the equivalent of 3 passes.

In high solids cases, where desired, cationic coagulant or spent brine was added to each sample prior to processing with the high-shear mixing equipment. Viscosity was subsequently measured after cooling to room temperature and after treatment with the APV Gaulin laboratory homogenizer. In low/intermediate solids cases, where desired, cationic coagulant or spent brine was added to each sample prior to processing with the APV Gaulin laboratory homogenizer. After treatment with the APV Gaulin laboratory homogenizer and after cooling to room temperature, viscosity was measured.

In this example, no supplemental additives such as CMC were used.

After being run through an APV Gaulin laboratory homogenizer, each sample was poured into a pre-weighed 5 ¼" high×2" diameter polyethylene bottle to capacity and capped. After the period of time indicated, the cap was the removed, and a glass stirring rod was inserted to the bottom of the bottle, where the end of the stirring rod was slowly rotated one turn around the inner periphery of the bottle. The bottle was then weighed, inverted 1800 for a period of 15 seconds, reweighed, and percent drainage calculated as follows:

$$\% \text{ drainage} = \frac{\text{(filled bottle weight} - \text{drained bottle weight)}}{\text{(filled bottle weight} - \text{bottle weight)}} \times 100$$

The solids remaining in the bottle were probed with a stirring rod to ensure that they were soft.

The initial viscosity and drainage test results after 7, 14 and 28 days are given in the Tables 1 and 2 below for slurries with various percent solids levels, chloride levels, cationic coagulants, and cationic coagulant levels.

Table 1 illustrates that, for a given solids level of 63% and a chloride concentration of 0.46–0.47 wt % dry MgO basis, the amount of each of the several cationic coagulants tested was optimized for maximum drainage. In general, the same cationic coagulant level which produced optimum results at 7 days, also produced optimum results at 14 and 28 days. The results of Table 1 also illustrate that viscosity can be used as a guide to optimize cationic coagulant addition. In general, lower viscosities result in higher drainages. However, this trend reverses, and at viscosities of about 70 cps or less, when percent solids exceeds 50%, the opposite effect is observed, and the remaining sediment becomes hard or tacky and is not readily removable.

Table 2 illustrates that the amount of cationic coagulant to be added should be based on liquor chloride concentration. In Table 2, no HollyFix 1 is added where the chloride liquor concentration is 3.0 g/l, 1000 ppm HollyFix 1 is added where the chloride liquor concentration is 4.0 g/l, and 2500 ppm HollyFix 1 is added where the chloride liquor concentration is 5.0 g/l. As noted above, 4.0 g/l is near or at the first and second chloride threshold levels, respectively, of the magnesium hydroxide slurry.

The inventors have constructed Table 3, for the convenience of those skilled in the art. In Table 3, chloride liquor content in g/l is calculated for percent solids v. percent chloride on a magnesium hydroxide basis. The left-hand dotted line in Table 3 represents the first chloride threshold level of about 2.7 g/l and the right-hand dotted line represents the second chloride threshold level of about 4.0 g/l.

TABLE 1

| CATIONIC COAGULANT | DOSAGE LEVEL | PERCENT CHLORIDES (MgO BASIS) | PERCENT SOLIDS | GAULIN VISCOSITY (cps) | DRAINAGE TESTS 7-DAY(%) | 14-DAY(%) | 28-DAY(%) |
|---|---|---|---|---|---|---|---|
| HOLLYFIX-1 | 100 | 0.47 | 63.0 | 308 | 91.5 | 85.4 | 62.0 |
|  | 300 | 0.47 | 63.0 | 234 | 92.5 | 88.4 | 78.0 |
|  | 500 | 0.47 | 63.0 | 209 | 93.4 | 90.3 | 81.7 |
|  | 1000 | 0.47 | 63.0 | 204 | 93.7 | 91.5 | 86.8 |
|  | 2000 | 0.47 | 63.0 | 180 | 95.0 | 92.6 | 86.4 |
|  | 5000 | 0.47 | 63.0 | 203 | 94.6 | 92.7 | 87.8 |
| BETZ 1180 | 100 | 0.47 | 63.0 | 333 | 92.2 | 88.8 | 77.3 |
|  | 300 | 0.47 | 63.0 | 304 | 93.0 | 88.4 | 81.3 |
|  | 500 | 0.47 | 63.0 | 300 | 93.4 | 90.4 | 84.3 |
|  | 1000 | 0.47 | 63.0 | 360 | 91.9 | 88.2 | 82.1 |
|  | 2000 | 0.47 | 63.0 | 576 | 91.6 | 85.4 | 79.1 |
| BETZ 1190 | 100 | 0.47 | 63.0 | 330 | 92.8 | 89.0 | 84.2 |
|  | 300 | 0.47 | 63.0 | 324 | 92.8 | 89.0 | 84.7 |
|  | 500 | 0.47 | 63.0 | 320 | 92.8 | 90.0 | 87.6 |
|  | 1000 | 0.47 | 63.0 | 361 | 92.8 | 90.0 | 83.4 |
| BETZ 1192 | 100 | 0.47 | 63.0 | 321 | 91.7 | 87.8 | 82.7 |
|  | 300 | 0.47 | 63.0 | 304 | 92.8 | 89.8 | 85.2 |
|  | 500 | 0.47 | 63.0 | 328 | 92.7 | 89.9 | 84.5 |
|  | 1000 | 0.47 | 63.0 | 354 | 93.0 | 88.1 | 83.3 |
| BETZ 1195 | 100 | 0.46 | 63.0 | 249 | 94.3 | 91.2 | 86.5 |
|  | 300 | 0.46 | 63.0 | 228 | 95.0 | 88.1 | 90.0 |
|  | 500 | 0.46 | 63.0 | 225 | 94.3 | 92.4 | 90.3 |
|  | 1000 | 0.46 | 63.0 | 292 | 93.4 | 91.2 | 89.0 |
|  | 2000 | 0.46 | 63.0 | 348 | 93.8 | 92.1 | 87.6 |
| RHONE POULENC C-308P | 100 | 0.46 | 63.0 | 250 | 94.4 | 91.6 | 86.6 |
|  | 300 | 0.46 | 63.0 | 238 | 93.8 | 92.2 | 87.1 |
|  | 500 | 0.46 | 63.0 | 226 | 94.8 | 93.3 | 89.7 |

TABLE 1-continued

| CATIONIC COAGULANT | DOSAGE LEVEL | PERCENT CHLORIDES (MgO BASIS) | PERCENT SOLIDS | GAULIN VISCOSITY (cps) | DRAINAGE TESTS | | |
|---|---|---|---|---|---|---|---|
| | | | | | 7-DAY(%) | 14-DAY(%) | 28-DAY(%) |
| | 1000 | 0.46 | 63.0 | 282 | 94.4 | 90.5 | 86.6 |
| | 2000 | 0.46 | 63.0 | 323 | 98.4 | 92.8 | 86.1 |
| RHONE POULENC C-309P | 100 | 0.47 | 63.0 | 303 | 94.6 | 88.9 | 84.7 |
| | 300 | 0.47 | 63.0 | 270 | 89.7 | 90.5 | 86.4 |
| | 500 | 0.47 | 63.0 | 264 | 94.0 | 90.4 | 87.0 |
| | 1000 | 0.47 | 63.0 | 331 | 93.5 | 88.8 | 86.2 |
| | 2000 | 0.47 | 63.0 | 393 | 93.8 | 87.7 | 85.0 |
| RHONE POULENC C-319P | 100 | 0.47 | 63.0 | 265 | 93.9 | 90.4 | 88.2 |
| | 300 | 0.47 | 63.0 | 264 | 95.1 | 91.2 | 85.7 |
| | 500 | 0.47 | 63.0 | 258 | 94.1 | 91.6 | 86.4 |
| | 1000 | 0.47 | 63.0 | 320 | 93.8 | 90.1 | 86.9 |
| | 2000 | 0.47 | 63.0 | 395 | 93.1 | 90.2 | 84.5 |
| RHONE POULENC C-358P | 100 | 0.47 | 63.0 | 304 | 93.2 | 89.0 | 82.2 |
| | 300 | 0.47 | 63.0 | 304 | 94.1 | 88.5 | 78.4 |
| | 500 | 0.47 | 63.0 | 310 | 93.7 | 90.1 | 81.1 |
| | 1000 | 0.47 | 63.0 | 390 | 93.3 | 87.2 | 76.4 |

TABLE 2

| | PERCENT SOLIDS | CHLORIDE (%) MgO BASIS | HOLLYFIX-1 (ppm) | GAULIN VISCOSITY (cps) | DRAINAGE TEST RESULT | | |
|---|---|---|---|---|---|---|---|
| | | | | | 7-DAY (%) | 14-DAY (%) | 28-DAY (%) |
| LIQUOR CHLORIDE CONC. 3.0 g/l | 68.4 | 0.20 | 0 | 207 | 95.4 | 95.2 | 95.8 |
| | 59.2 | 0.32 | 0 | 76 | 97.0 | 95.8 | 93.7 |
| | 55.5 | 0.34 | 0 | 71 | 96.1 | 94.7 | 91.5 |
| | 52.0 | 0.40 | 0 | 46 | 97.5 | 96.1 | 94.4 |
| | 49.0 | 0.45 | 0 | 49 | 97.3 | 96.8 | 94.6 |
| | 46.4 | 0.51 | 0 | 42 | 97.6 | 95.9 | 94.2 |
| | 44.0 | 0.56 | 0 | 44 | 97.2 | 95.2 | 94.0 |
| | 42.0 | 0.60 | 0 | 43 | 97.2 | 95.1 | 94.0 |
| | 40.0 | 0.66 | 0 | 34 | 96.5 | 95.0 | 93.9 |
| LIQUOR CHLORIDE CONC. 4.00 g/l | 42.0 | 0.80 | 1000 | 38 | 94.2 | 94.8 | 94.3 |
| | 47.0 | 0.66 | 1000 | 48 | 96.4 | 96.2 | 95.5 |
| | 59.0 | 0.39 | 1000 | 91 | 97.6 | 96.4 | 93.3 |
| | 66.0 | 0.29 | 1000 | 121 | 98.7 | 95.8 | 94.2 |
| LIQUOR CHLORIDE CONC. 5.00 g/l | 42.0 | 1.02 | 2500 | 68 | 93.3 | 93.0 | 92.4 |
| | 47.0 | 0.81 | 2500 | 57 | 95.7 | 95.2 | 94.2 |
| | 59.0 | 0.51 | 2500 | 107 | 96.7 | 95.0 | 90.4 |
| | 67.0 | 0.34 | 2500 | 233 | 96.1 | 94.3 | 90.4 |

TABLE 3

| PERCENT SOLIDS | PERCENT CHLORIDE (Mg(OH)2) BASIS | | | | | | | | | | | | | | |
|---|---|---|---|---|---|---|---|---|---|---|---|---|---|---|---|
| | 0.10 | 0.15 | 0.20 | 0.25 | 0.30 | 0.35 | 0.40 | 0.45 | 0.50 | 0.55 | 0.60 | 0.65 | 0.70 | 0.75 | 0.80 |
| 30 | 0.43 | 0.64 | 0.86 | 1.07 | 1.29 | 1.50 | 1.71 | 1.93 | 2.14 | 2.36 | 2.50 | 2.79 | 3.00 | 3.21 | 3.43 |
| 31 | 0.45 | 0.67 | 0.90 | 1.12 | 1.35 | 1.57 | 1.80 | 2.02 | 2.25 | 2.47 | 2.10 B | 2.92 | 3.14 | 3.37 | 3.59 |
| 32 | 0.47 | 0.11 | 0.94 | 1.18 | 1.41 | 1.65 | 1.88 | 2.12 | 2.35 | 2.59 | 2.82 | 3.06 | 3.29 | 3.53 | 3.76 |
| 33 | 0.49 | 0.74 | 0.99 | 1.23 | 1.48 | 1.72 | 1.97 | 2.22 | 2.46 | 2.71 | 2.96 | 3.20 | 3.45 | 3.69 | 3.94 C |
| 34 | 0.52 | 0.71 | 1.03 | 1.29 | 1.55 | 1.80 | 2.06 | 2.32 | 2.58 | 2.83 | 3.09 | 3.35 | 3.61 | 3.86 | 4.12 |
| 35 | 0.54 | 0.81 | 1.08 | 1.35 | 1.62 | 1.88 | 2.15 | 2.42 | 2.89 | 2.96 | 3.23 | 3.50 | 3.77 | 4.04 | 4.11 |
| 36 | 0.56 | 0.84 | 1.13 | 1.41 | 1.69 | 1.97 | 2.25 | 2.53 | 2.81 | 3.09 | 3.37 | 3.66 | 3.94 | 4.22 | 4.50 |
| 37 | 0.59 | 0.88 | 1.17 | 1.47 | 1.76 | 2.06 | 2.35 | 2.64 | 2.94 | 3.23 | 3.52 | 3.82 | 4.11 | 4.40 | 4.70 |
| 38 | 0.61 | 0.92 | 1.23 | 1.53 | 1.84 | 2.15 | 2.45 | 2.76 | 3.06 | 3.37 | 3.68 | 3.98 | 4.29 | 4.60 | 4.90 |
| 39 | 0.64 | 0.96 | 1.28 | 1.60 | 1.92 | 2.24 | 2.56 | 2.88 | 3.20 | 3.52 | 3.84 | 4.16 | 4.48 | 4.80 | 5.11 |
| 40 | 0.67 | 1.00 | 1.33 | 1.67 | 2.00 | 2.33 | 2.67 | 3.00 | 3.33 | 3.67 | 4.80 | 4.33 | 4.67 | 5.00 | 5.33 |
| 41 | 0.69 | 1.04 | 1.39 | 1.74 | 2.08 | 2.43 | 2.78 | 3.13 | 3.47 | 3.82 | 4.17 | 4.52 | 4.86 | 5.21 | 5.56 |
| 42 | 0.72 | 1.09 | 1.45 | 1.81 | 2.17 | 2.53 | 2.90 | 3.26 | 3.62 | 3.98 | 4.34 | 4.71 | 5.07 | 5.43 | 5.79 |
| 43 | 0.75 | 1.13 | 1.51 | 1.89 | 2.26 | 2.64 | 3.02 | 3.39 | 3.77 | 4.15 | 4.53 | 4.90 | 5.28 | 5.66 | 6.04 |
| 44 | 0.79 | 1.18 | 1.57 | 1.96 | 2.36 | 2.75 | 3.14 | 3.54 | 3.93 | 4.32 | 4.71 | 5.11 | 5.50 | 5.89 | 6.29 |
| 45 | 0.82 | 1.23 | 1.64 | 2.05 | 2.45 | 2.86 | 3.27 | 3.68 | 4.09 | 4.50 | 4.91 | 5.32 | 6.73 | 6.14 | 6.55 |
| 46 | 0.85 | 1.28 | 1.70 | 2.13 | 2.56 | 2.98 | 3.41 | 3.83 | 4.26 | 4.69 | 5.11 | 5.54 | 6.96 | 6.39 | 6.81 |
| 47 | 0.85 | 1.33 | 1.77 | 2.22 | 2.68 | 3.10 | 3.55 | 3.89 | 4.43 | 4.88 | 5.32 | 57.6 | 6.21 | 6.65 | 7.09 |
| 48 | 0.92 | 1.38 | 1.85 | 2.31 | 2.77 | 3.23 | 3.69 | 4.15 | 4.62 | 5.08 | 5.54 | 6.00 | 6.46 | 6.92 | 7.38 |
| 49 | 0.96 | 1.44 | 1.92 | 2.40 | 2.88 | 3.36 | 3.84 | 4.32 | 4.80 | 5.28 | 5.76 | 6.25 | 6.73 | 7.21 | 7.69 |
| 50 | 1.00 | 1.50 | 2.00 | 2.50 | 3.00 | 3.50 | 4.80 | 4.50 | 5.00 | 5.50 | 6.00 | 6.50 | 7.00 | 7.50 | 8.00 |
| 51 | 1.04 | 1.56 | 2.08 | 2.60 | 3.12 | 3.64 | 4.16 | 4.68 | 5.20 | 5.72 | 6.24 | 6.77 | 7.29 | 7.81 | 8.33 |
| 52 | 1.08 | 1.63 | 2.17 | 2.71 | 3.25 | 3.79 | 4.33 | 4.88 | 5.42 | 5.96 | 6.50 | 7.04 | 7.58 | 8.13 | 8.67 |
| 53 | 1.13 | 1.69 | 2.26 | 2.82 | 3.38 | 3.98 | 4.51 | 5.07 | 5.64 | 6.20 | 6.77 | 7.33 | 7.89 | 8.46 | 9.02 |
| 54 | 1.17 | 1.76 | 2.35 | 2.93 | 3.52 | 4.11 | 4.70 | 5.28 | 5.87 | 6.46 | 7.04 | 7.63 | 8.22 | 8.80 | 9.39 |
| 55 | 1.22 | 1.83 | 2.44 | 3.06 | 3.67 | 4.28 | 4.89 | 5.50 | 6.11 | 6.72 | 7.33 | 7.94 | 8.56 | 9.17 | 9.78 |
| 56 | 1.27 | 1.91 | 2.55 | 3.18 | 3.82 | 4.45 | 5.09 | 5.73 | 6.36 | 7.00 | 7.64 | 8.27 | 8.91 | 9.55 | 10.18 |
| 57 | 1.33 | 1.99 | 2.66 | 3.31 | 3.85 | 4.64 | 5.30 | 5.97 | 6.63 | 7.29 | 7.95 | 8.62 | 9.28 | 9.94 | 10.60 |
| 58 | 1.38 | 2.07 | 2.76 | 3.45 | 4.14 | 4.83 | 5.52 | 6.21 | 6.90 | 7.60 | 8.29 | 8.98 | 9.67 | 10.36 | 11.05 |
| 59 | 1.44 | 2.16 | 2.88 | 3.60 | 4.32 | 5.04 | 5.76 | 6.48 | 7.20 | 7.91 | 8.63 | 9.35 | 10.07 | 10.79 | 11.51 |
| 60 | 1.50 | 2.25 | 3.00 | 3.75 | 4.50 | 5.25 | 6.00 | 6.75 | 7.50 | 8.25 | 9.00 | 9.75 | 10.50 | 11.25 | 12.00 |
| 61 | 1.56 | 2.35 | 3.13 | 3.91 | 4.69 | 5.47 | 6.26 | 7.04 | 7.82 | 8.60 | 9.38 | 10.17 | 10.95 | 11.73 | 12.51 |
| 62 | 1.63 | 2.45 | 3.26 | 4.08 | 4.89 | 5.71 | 6.53 | 7.34 | 8.16 | 8.97 | 9.79 | 10.61 | 11.42 | 12.24 | 13.05 |
| 63 | 1.70 | 2.55 | 3.41 | 4.26 | 5.11 | 5.96 | 6.81 | 7.66 | 8.51 | 9.36 | 10.22 | 11.07 | 11.92 | 12.77 | 13.62 |
| 64 | 1.78 A | 2.67 | 3.56 | 4.44 | 5.33 | 6.22 | 7.11 | 8.00 | 8.89 | 9.78 | 10.67 | 11.56 | 12.44 | 13.33 | 14.22 |
| 65 | 1.86 | 2.79 | 3.71 | 4.64 | 5.57 | 6.50 | 7.43 | 8.36 | 9.29 | 10.21 | 11.14 | 12.07 | 13.00 | 13.93 | 14.86 |
| 66 | 1.94 | 2.91 | 3.88 | 4.85 | 5.82 | 6.79 | 7.76 | 8.74 | 9.71 | 10.68 | 11.65 | 12.62 | 13.59 | 14.56 | 15.53 |
| 67 | 2.03 | 3.05 | 4.06 D | 5.08 | 6.09 | 7.11 | 8.12 | 9.14 | 10.15 | 11.17 | 12.18 | 13.20 | 14.21 | 15.23 | 16.24 |
| 68 | 2.13 | 3.19 | 4.25 | 5.31 | 6.38 | 7.44 | 8.50 | 9.56 | 10.63 | 11.69 | 12.75 | 13.81 | 14.87 | 15.94 | 17.00 |
| 69 | 2.23 | 3.34 | 4.45 | 5.56 | 6.68 | 7.79 | 8.90 | 10.02 | 11.13 | 12.24 | 13.35 | 14.47 | 15.68 | 16.69 | 17.81 |
| 70 | 2.33 | 3.50 | 4.67 | 5.83 | 7.00 | 8.17 | 9.33 | 10.50 | 11.67 | 12.63 | 14.00 | 15.77 | 16.33 | 17.50 | 18.67 |

We claim:

1. A deflocculated stabilized magnesium hydroxide slurry comprising:
   a solids content ranging from about 30% to about 80%;
   a liquor comprising a controlled chloride concentration at least above a first threshold level of about 2.7 g/l or above a second threshold level of about 4.0 g/l;
   wherein if said liquor comprises a chloride concentration between said first threshold level and said second threshold level, said slurry does not require a cationic coagulant to achieve stability;
   wherein if said liquor comprises a chloride concentration greater than or equal to said second threshold level, said liquor also comprises a cationic coagulant;
   wherein said cationic coagulant acts as a dispersant and contributes to stability; and
   wherein said stabilized deflocculated slurry demonstrates stability by having a drainage test result of at least 90% after 7 days, a drainage test result of at least 85% after 14 days, and a drainage test result of at least 80% after 28 days.

2. The magnesium hydroxide slurry of claim 1, wherein said liquor comprises greater than or equal to said second threshold level of chloride and said cationic coagulant.

3. The magnesium hydroxide slurry of claim 2, wherein said cationic coagulant is present in said liquor at a concentration from about 10 to about 5000 ppm.

4. The magnesium hydroxide slurry of claim 3, wherein said cationic coagulant has a molecular weight ranging from about 100,000 to 500,000.

5. The magnesium hydroxide slurry of claim 2, wherein said cationic coagulant is selected from the group consisting of polyamines, polyquaternaries, polydiallyldimethyl ammonium chlorides, epichlorohydrin-dimethylamines and dicyandiamide-formaldehyde condensates.

6. The magnesium hydroxide slurry of claim 1, further comprising at least one member selected from the group consisting of carboxymethylcellulose, guar gum, and xanthum gum.

7. The magnesium hydroxide slurry of claim 1, further comprising carboxymethylcellulose in a range from about 5 ppm to about 100 ppm.

8. The magnesium hydroxide slurry of claim 1, wherein said solids content ranges from about 60% to about 65%.

9. A method for producing a deflocculated stabilized magnesium hydroxide slurry comprising:
   providing a starting magnesium hydroxide slurry comprising a solids content of about 30 to about 80% and a liquor;

determining a first chloride concentration in said liquor;

comparing the first chloride concentration in the liquor to a first threshold level of about 2.7 g/l and to a second threshold level of about 4.0 g/l;

controlling a chloride concentration in said liquor by adding chloride to achieve at least a second chloride concentration in the liquor ranging from said first threshold level to less than said second threshold level, if said first chloride concentration in the liquor is less than said first threshold level;

wherein if said liquor comprises a chloride concentration between said first threshold level and said second threshold levels, said slurry does not require cationic coagulant to achieve stability;

adding cationic coagulant to said magnesium hydroxide slurry, if said first chloride concentration in the liquor is greater than or equal to said second threshold level, wherein said cationic coagulant acts as a dispersant and contributes to stability; and deflocculating said magnesium hydroxide slurry;

wherein said deflocculated stabilized magnesium hydroxide slurry demonstrates stability by having a drainage test result of at least 90% after 7 days, a drainage test result of at least 85% after 14 days, and a drainage test result of at least 80% after 28 days.

10. The method of claim 9, wherein the chloride concentration in the liquor is greater than or equal to said second threshold level; and wherein said liquor also comprises cationic coagulant.

11. The method of claim 10, wherein said cationic coagulant is present in the liquor at a concentration from about 10 to about 5000 ppm.

12. The method of claim 11, wherein said cationic coagulant has a molecular weight ranging from about 100,000 to 500,000.

13. The method of claim 11, wherein said cationic coagulant is selected from the group consisting of polyamines, polyquaternaries, polydiallyl-dimethyl ammonium chlorides, and epichlorohydrin-dimethylamines.

14. The method of claim 9, wherein said starting magnesium hydroxide slurry is dewatered to obtain a dewatered magnesium hydroxide cake having a solids content ranging from about 60% to about 80%; and wherein said dewatered magnesium hydroxide cake is subjected to sufficient mechanical shear to reduce the viscosity of said dewatered magnesium hydroxide cake to about 100 to 1000 cps.

15. The method of claim 14, wherein said mechanical shear is applied at a shear strain rate of about 130,000 to about 150,000 s$^{-1}$.

16. The method of claim 9, wherein said starting magnesium hydroxide slurry is dewatered to obtain a dewatered magnesium hydroxide cake having a solids content ranging from about 60% to about 80%; and wherein said dewatered magnesium hydroxide cake is combined with water or a start-up magnesium hydroxide slurry having a viscosity of at most 1500 cps to form a mixture and mechanical shear is applied to said mixture in an amount sufficient to provide a magnesium hydroxide slurry having a viscosity of between about 100 and 1000 cps.

17. The method of claim 16, wherein said starting slurry is a magnesium hydroxide slurry having a solids content ranging from about 55% to about 70%.

18. The method of claim 9, wherein said first chloride concentration is present in said liquor at a concentration that is less than said first threshold levels, and wherein additional chloride is added to said magnesium hydroxide slurry to achieve a chloride concentration in the liquor between said first threshold level and said second threshold level.

19. The method of claim 18, wherein the source of added chloride is spent brine.

20. The method of claim 9, wherein said step of deflocculating is conducted using equipment that induces cavitation in the slurry.

21. The method of claim 9, wherein said solids content ranges from about 60% to about 65%.

22. A stabilized deflocculated magnesium hydroxide slurry comprising:

a solids content ranging from about 50% to about 60%;

a liquor comprising a controlled chloride concentration at least above a first threshold level of about 2.7 g/l or above a second threshold level of about 4.0 g/l;

wherein if said liquor comprises a chloride concentration between said first threshold level and said second threshold level, said slurry does require a cationic coagulant to achieve stability;

wherein if said liquor comprises a chloride concentration greater than or equal to said second threshold level, said liquor also comprises a cationic coagulant selected from the group consisting of polyamines, polyquaternaries, polydiallyl-dimethyl ammonium chlorides, and epichlorohydrin-dimethylamines, wherein said cationic coagulant acts as a dispersant and contributes to stability;

wherein said stabilized deflocculated slurry demonstrates stability by having a drainage test result of at least 90% after 7 days, a drainage test result of at least 85% after 14 days, and a drainage test result of at least 80% after 28 days.

23. The magnesium hydroxide slurry of claim 22, wherein said liquor comprises greater than or equal to said second threshold level of chloride and said cationic coagulant is present at a concentration of about 10 to about 5000 ppm.

24. The magnesium hydroxide slurry of claim 23, wherein said cationic coagulant has a molecular weight ranging from about 100,000 to 500,000.

25. The magnesium hydroxide slurry of claim 22, further comprising an additive selected from one or more of the group consisting of carboxymethylcellulose, guar gum, and xanthum gum.

26. The magnesium hydroxide slurry of claim 22, further comprising carboxymethylcellulose in a range from about 5 ppm to about 100 ppm.

27. A stabilized deflocculated magnesium hydroxide slurry comprising:

a solids content ranging from about 30% to about 50%;

a liquor comprising a controlled chloride concentration at least above a first threshold level of about 2.7 g/l or above a second threshold level of about 4.0 g/l;

wherein if said liquor comprises a chloride concentration between said first threshold level and said second threshold level, said slurry does not require a cationic coagulant to achieve stability;

wherein if said liquor comprises a chloride concentration greater than or equal to said second threshold level, said liquor also comprises a cationic coagulant;

wherein said cationic coagulant acts as a dispersant and contributes to stability; and wherein said stabilized deflocculated slurry demonstrates stability by having a drainage test result of at least 90% after 7 days, a drainage test result of at least 85% after 14 days, and a drainage test result of at least 80% after 28 days.

28. The magnesium hydroxide slurry of claim 27, wherein said liquor comprises greater than or equal to said second threshold level of chloride and wherein said cationic coagulant is present in said liquor at a concentration from about 10 to about 5000 ppm.

29. The magnesium hydroxide slurry of claim 27, further comprising at least one an additive selected from the group consisting of one or more of carboxymethylcellulose, guar gum, and xanthum gum.

30. The magnesium hydroxide slurry of claim 27, further comprising carboxymethylcellulose in a range from about 5 ppm to about 100 ppm.

31. The magnesium hydroxide slurry of claim 27, wherein said cationic coagulant has a molecular weight ranging from about 100,000 to 500,000.

32. The magnesium hydroxide slurry of claim 27, wherein said cationic coagulant is selected from the group consisting of polyamines, polyquaternaries, polydiallyl-dimethyl ammonium chlorides, epichlorohydrin-dimethylamines and dicyandiamide-formaldehyde condensates.

33. A stabilized magnesium hydroxide slurry comprising a solids content ranging from about 30% to about 80% and a liquor;
  wherein said liquor comprises a chloride concentration defined by an area within the lines connecting points A, B, C and D of Table 3.

34. A stabilized magnesium hydroxide slurry comprising magnesium hydroxide solids and a liquor, wherein said liquor comprises chloride ion at a concentration between about 2.7 g/l and 4.0 g/l, and wherein said slurry does not contain cationic coagulant.

35. A stabilized magnesium hydroxide slurry comprising magnesium hydroxide solids and a liquor, wherein said liquor comprises chloride ion at a concentration above about 4.0 g/l and a cationic coagulant, wherein said cationic coagulant acts as a dispersant in said magnesium hydroxide slurry, and wherein said cationic coagulant contributes to stability.

36. A deflocculated stabilized magnesium hydroxide slurry comprising:
  a solids content ranging from about 30% to about 80%;
  a liquor comprising a controlled chloride concentration between about 2.7 g/l and about 4.0 g/l;
  wherein said slurry does not contain cationic coagulant and still achieves stability;
  wherein said stabilized deflocculated slurry demonstrates stability by having a drainage test result of at least 90% after 7 days, a drainage test result of at least 85% after 14 days, and a drainage test result of at least 80% after 28 days.

37. A deflocculated stabilized magnesium hydroxide slurry comprising:
  a solids content ranging from about 30% to about 80%;
  a liquor comprising a controlled chloride concentration above about 4.0 g/l;
  wherein said liquor also comprises a cationic coagulant;
  wherein said cationic coagulant acts as a dispersant and contributes to stability; and
  wherein said stabilized deflocculated slurry demonstrates stability by having a drainage test result of at least 90% after 7 days, a drainage test result of at least 85% after 14 days, and a drainage test result of at least 80% after 28 days.

* * * * *